United States Patent

[11] 3,618,708

| [72] | Inventor | Darrel D. Deines<br>Mocksville, N.C. |
|---|---|---|
| [21] | Appl. No. | 3,857 |
| [22] | Filed | Jan. 19, 1970 |
| [45] | Patented | Nov. 9, 1971 |
| [73] | Assignee | Ingersoll-Rand Company<br>New York, N.Y. |

[54] COMPRESSOR COOLING AND LUBRICATING SYSTEM
4 Claims, 1 Drawing Fig.

[52] U.S. Cl. ................................................ 184/6.4,
184/6.16, 417/286
[51] Int. Cl. ............................................... F16n 29/02
[50] Field of Search ........................................ 62/468;
417/372, 248, 286; 418/90, 84; 184/6 R, 6 L, 6 D,
6.1; 60/39.08, 39.09

[56] References Cited
UNITED STATES PATENTS
| 2,440,371 | 4/1948 | Holley, Jr. ............... | 417/286 |
|---|---|---|---|
| 2,570,134 | 10/1951 | Lancaster et al. ........ | 184/6 X |
| 2,655,111 | 10/1953 | Schanzlin ................. | 417/286 |
| 2,701,684 | 2/1955 | Hirsch ...................... | 184/6 L X |
| 2,871,981 | 2/1959 | Baits ........................ | 184/6 D |

FOREIGN PATENTS
| 535,276 | 10/1955 | Belgium ................... | 184/6 L |

Primary Examiner—Manuel A. Antonakas
Attorneys—Carl R. Horten, David W. Tibbott and Bernard J. Murphy

ABSTRACT: A lubrication system including a pump, compressor-driven, and thus subject to compressor speed excursions provided for supplying lubricant to the compressor, and a pressurized lubricant reservoir (which is pressurized by the compressor) also supplied for providing supplementary lubricant to the compressor. With high-speed operation of the compressor, the pump supplies the full lubricant requirement. With the compressor speed reduced, the pump accordingly delivers less than the full quantity of lubricant required by the compressor. It is at this time that the reservoir of lubricant, pressure-responsively, by way of a check-valved shunt line, automatically supplies the supplementary or makeup quantity of lubricant for the compressor.

PATENTED NOV 9 1971
3,618,708
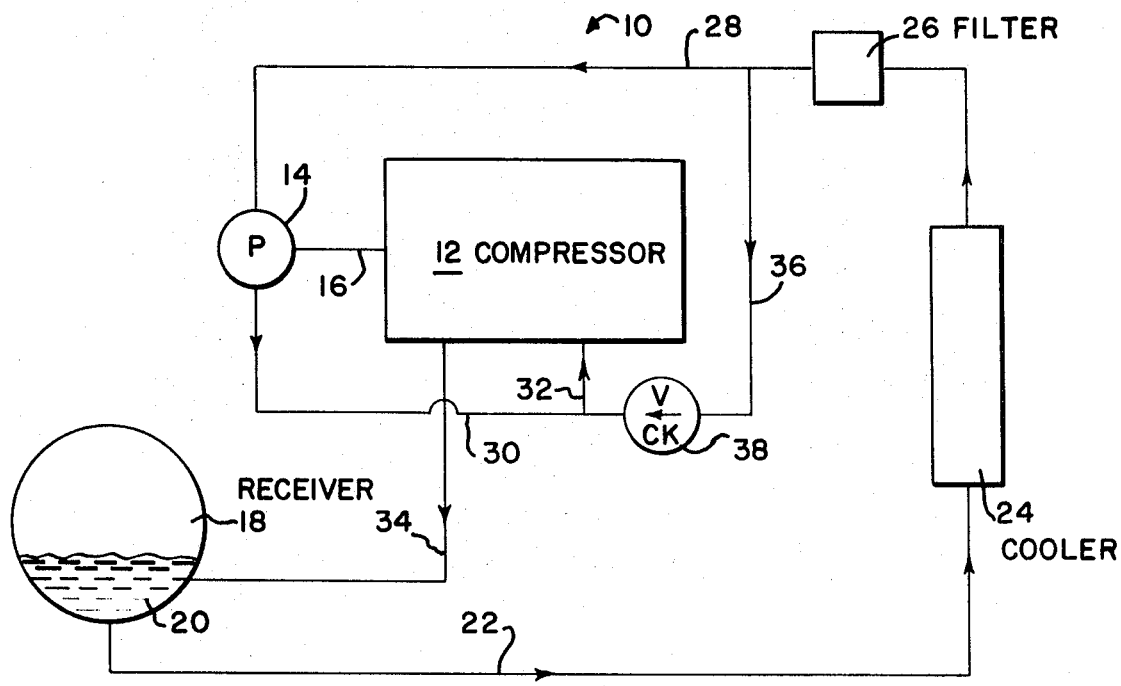
INVENTOR
*DARREL D. DEINES*
BY
*Bernard J. Murphy*
AGENT

COMPRESSOR COOLING AND LUBRICATING SYSTEM

This invention pertains to a lubrication system for gas compressors, and in particular to a system providing a more comprehensive lubricant supply which is less subject to compressor speed excursions and compressor system-pressure variations.

It is already known in the prior art to supply lubricant to a compressor by means of a pump driven by the compressor. However, when the compressor is decelerated, the pump is also decelerated and there results therefrom a reduced flow of lubricant to the compressor. Alternatively, it is also known to provide lubricant to a compressor from a lubricant reservoir confined within, and subject to the pressurization of, a receiver-separator. In this arrangement the lubricant supply is not subject to compressor speed variations. However, as quantities of the compressed gas product are withdrawn from the receiver-separator, the pressure of the lubricant in the reservoir is reduced. Thus, lubricant flow, again, is reduced. Also, in the receiver reservoir arrangement, the lubricant and the supply thereof to the compressor may be subject to ambient temperature variations so that, with low temperature conditions, a resulting high viscosity of the reservoir lubricant also will occasion a reduced lubricant flow to the compressor.

It is an object of this invention to avoid limitations found in prior art lubrication systems, such as those just cited.

Notably, it is an object of this invention to provide a plurality of means for supplying lubricant to a compressor subject to speed excursions of $N-x$ to $N$, for instance, in which at least one of said means constantly supplies lubricant to the compressor during compressor operation at lubricant flow rates, i.e., $N-x$ to $N$, which directly correspond and vary with the compressor speed variations, and another lubricant supply means of the plurality thereof is automatically responsive to a reduced lubricant flow rate (i.e., less than $N$) of said one means, to supply lubricant to the compressor, tending to maintain a constant and invariable total lubricant flow to the compressor at all times.

Another object of this invention is to provide a lubrication system, for a gas compressor requiring lubricant to be supplied thereto at not less than some given rate of flow, having a plurality of means each operative for supplying lubricant to said compressor at flow rates of less than and at least as great as said given rate in which one means of said plurality is operative, coincident with compressor operation, to supply lubricant to the compressor, and another means of said plurality is operative automatically, in response to a lubricant-supply operation of said one means at a flow rate of less than said given rate, to supply lubricant to the compressor.

A feature of this invention comprises the provisioning of a lubricant pump driven, according to the disclosed embodiment, by the compressor. The pump operates in synchronism with the compressor and, accordingly, supplies fluid at varying rates. Therefore, the invention teaches the use of an additional supplementary or second lubricant supply means, comprising a receiver-separator having a lubricant reservoir which, automatically responsive to deceleration of the lubricant pump, provides makeup or supplementary quantities of lubricant to the compressor.

The accompanying drawing discloses a schematic representation preferred embodiment of the invention.

Further objects and features of this invention will become more apparent by reference to the following description taken in conjunction with the accompanying FIGURE in which the system 10 is shown schematically, only by way of example, in conjunction with a gas compressor 12 of the lubricant-flooded-type. A pump 14 is included in the system for providing a constant supply of fluid to the compressor at all times that the compressor is in operation. In this embodiment, the pump 14 is driven by, and synchronously with, the compressor via a drive coupling 16. The system further includes a receiver-separator 18 for receiving and confining the compressed gas output of the compressor, and includes therewithin a reservoir 20 of a supply of lubricant for the compressor 12.

A lubrication supply line or piping 22 connects the reservoir 20 lubricant supply to a cooler 24 and from there to a filter 26. The cooled and filtered output of lubricant is supplied by way of pump inlet line or piping 28 to the pump 14. Pump 14, by way of outlet line or piping 30, supplies a steady flow of lubricant, a flow of a rating of $N$, let us say, to the compressor through a compressor lubricant, inlet line 32.

The compressor 12 has outlet or gas discharge line 34 for the compressed gas product which conducts the latter to the receiver-separator 18. The gas product in the receiver-separator pressurizes the supply of lubricant in the reservoir 20.

As the compressor 12 is throttled and decelerated (by means not shown), pump 14 is also decelerated so that the supply of lubricant provided to the compressor by the pump becomes markedly reduced to a flow rating of $N-x$, for example.

To overcome this deficiency, the missing flow rate component given as "x", my invention teaches the provisioning of a shunt line or piping 36 through connecting between piping 28 and 30. The shunt line 36 bypasses pump 14. It has a check valve 38 disposed therein to prohibit a flow of lubricant from compressor lubricant inlet line 32, through piping 36 and back to line 28. Check valve 38 permits flow in only one direction through piping 36; that is, from filter 26 to line 32.

When compressor 12 is decelerated, as customarily will occur when the receiver-separator 18 is at or near full charge with a compressed gas product, the pump 14, in being driven by the compressor, will decelerate and be unable to supply a full flow of lubricant to the compressor. In this event the high pressure in the receiver-separator 18 will force lubricant, i.e. a supplementary quantity thereof through line 36, through the check valve 38, and into the compressor 12. Therefore, at inlet line 32, an optimum supply of lubricant will be maintained.

Compressor 12, in this embodiment at least, is presented as a lubricant-flooded-type which drives the pump 14 at the same speed of its own operation. HOwever, a gas compressor of any type will benefit from incorporation with this system. This compressor 12, like any compressor, of course requires a prescribed amount of lubricant, whether for lubrication only, or for cooling and lubricating, or whatever, and my novel system teaches means for insuring that the prescribed supply of the lubricant is provided to the compressor. It is also to be noted that even under conditions where low temperatures prevail a coagulation of the lubricant in the reservoir 20 will not present significant difficulties. The pump 14 will supply lubricant until the lubricant in the reservoir has been sufficiently warmed. So also, should it occur that pump 14 becomes disabled, my system, through the provisioning of the bypass or shunt line 36 insures that lubricant will still be supplied to the compressor from the receiver-separator reservoir 20.

As already noted, lubricant supply from a gas-pressured reservoir, or lubricant supply from a driven pump is already practiced. The limitations of each arrangement have long been known. However, the significant point which has escaped the attention of those knowledgeable in lubrication systems—until my inventive taching—is that the limitation of the one arrangement can be compensated by the advantages of the other, and vice versa. The driven pump arrangement moves into an area of inefficiency, with deceleration, when the pressured reservoir arrangement is at peak efficiency—deceleration being effected due to full reservoir pressurization. And conversely, with significant depressurization of the reservoir, the driven pump is given to increased speed and efficiency.

While I have described my invention in connection with a specific embodiment thereof it is to be clearly understood that this is done only by way of example and not as a limitation to the scope of my invention as set forth in the objects thereof and in the appended claims.

I claim:

1. A lubrication system, for a gas compressor, comprising:
   means for storing lubricant, said means including a reservoir of lubricant under pressurization;

first piping having one end thereof in fluid-flow communication with the compressor; and second piping having one end thereof in fluid-flow communication with the compressor; wherein opposite, other ends of said first and second piping are joined; and further comprising third piping, comprising a lubricant supply line, having one end thereof terminating at said reservoir and opening directly on lubricant stored in said reservoir, the opposite, other end of said third piping being joined with said opposite, other ends of said first and second piping, effecting a fluid through communication therewith;

a fluid pump, drivenly coupled to said compressor for synchronous operation therewith, interposed in said first piping, intermediate said one and other ends of said first piping, for controlling fluid flow through said first piping;

said second piping being in parallel with said first piping and providing a lubricant supply communication, between said reservoir and said compressor, which bypasses said pump, for the provisioning of supplementary quantities of lubricant to said compressor, in response to said pressurization.

2. A lubrication system, according to claim 1, wherein:
said reservoir is under indeterminate pressurization; and
said second piping provisions indeterminate supplementary quantities of lubricant to said compressor.

3. A lubrication system, according to claim 1, wherein:
said reservoir is under a given pressurization; and
said second piping provisions a given supplementary quantity of lubricant to said compressor in response to said given pressurization;
said provisioning of said given quantity causing an attenuation of pressure of said reservoir, which causes a complementary lessening of said lubricant provisioning by said second piping.

4. A lubrication system, according to claim 1, further including:
valving means interposed in said second piping means for permitting lubricant flow therethrough in only one direction.

* * * * *